United States Patent
Mizoguchi

(10) Patent No.: US 11,989,002 B2
(45) Date of Patent: May 21, 2024

(54) ENVIRONMENTAL TEMPERATURE CHANGE PREDICTION DEVICE AND PREDICTION METHOD FOR MACHINE TOOL

(71) Applicant: OKUMA CORPORATION, Niwa-Gun (JP)

(72) Inventor: Yuji Mizoguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 312 days.

(21) Appl. No.: 17/652,758

(22) Filed: Feb. 28, 2022

(65) Prior Publication Data

US 2022/0291656 A1    Sep. 15, 2022

(30) Foreign Application Priority Data

Mar. 11, 2021   (JP) .................. 2021-039561

(51) Int. Cl.
*G05B 19/4065*    (2006.01)
*G06N 5/04*    (2023.01)

(52) U.S. Cl.
CPC .......... *G05B 19/4065* (2013.01); *G06N 5/04* (2013.01); *G05B 2219/37428* (2013.01)

(58) Field of Classification Search
None
See application file for complete search history.

(56) References Cited

U.S. PATENT DOCUMENTS 10,584,892 B2 *   3/2020   Sasaki .................. F24F 11/61

FOREIGN PATENT DOCUMENTS

| EP | 2 944 891 A1 | 11/2015 |
| JP | 6160945 B2 | 7/2017 |

* cited by examiner

*Primary Examiner* — Ryan A Jarrett
(74) *Attorney, Agent, or Firm* — BURR PATENT LAW, PLLC

(57) ABSTRACT

An environmental temperature change prediction device includes an environmental temperature acquisition unit, an outside temperature acquisition unit, a plant environment pattern setting unit, a prediction model generating unit, and an environmental temperature change prediction unit. The environmental temperature acquisition unit measures a machine body temperature. The plant environment pattern setting unit defines in advance a classification rule for classifying change trends of the environmental temperature into a plurality of patterns based on data of the environmental temperature and the plant outside temperature and environmental temperature prediction models. The prediction model generating unit selects the applicable plant environment pattern and determines a parameter of the environmental temperature prediction model corresponding to the selected plant environment pattern. The environmental temperature change prediction unit predicts a change in the environmental temperature in a future by the environmental temperature prediction model generated in the prediction model generating unit.

12 Claims, 5 Drawing Sheets

ENVIRONMENTAL TEMPERATURE CHANGE PREDICTION DEVICE AND PREDICTION METHOD FOR MACHINE TOOL

BACKGROUND

This application claims the benefit of Japanese Patent Application Numbers 2021-039561 filed on Mar. 11, 2021, the entirety of which is incorporated by reference.

1. TECHNICAL FIELD

The disclosure relates to a device and a method that predict an environmental temperature change in a plant in which a machine tool is installed.

2. RELATED ART

When machining is performed using a machine tool, a thermal deformation occurs at each portion of the machine tool by influences, such as a machine heat generation of a spindle and feed axis operation and the like, a temperature change in an installation environment of the machine tool, and a temperature change of a coolant. The thermal displacement varies the relative position between a tool and a workpiece, and therefore, when the thermal displacement occurs in the machine tool during the machining, machining accuracy of the workpiece deteriorates. As a related art for avoiding deterioration in accuracy by influences of the thermal displacement of a machine tool, a thermal displacement correction is effective and widely used. The thermal displacement correction estimates a displacement amount based on a thermal displacement estimation formula programmed in advance from a temperature measured by a temperature sensor mounted on each structure portion of the machine tool or operation conditions of a spindle, a feed axis, and the like, and varies its axial moving amount according to the displacement amount.

However, especially for the thermal displacement due to a temperature change in an installation environment, it is difficult to accurately estimate the thermal displacement amount, and even in a machine with the thermal displacement correction, an error increases in some cases when the temperature change in the installation environment is large. Therefore, at a production site in some cases, accuracy is ensured by performing machining with a high required accuracy in a time slot when a room temperature change in a plant is small and conducting a dimension confirmation and correction in a time slot when the room temperature change is large. In many cases, the countermeasures considering the magnitude of the room temperature change are conducted depending on an empirical rule of a worker.

On the other hand, for a method of predicting the room temperature change inside a certain building, a related art, such as Japanese Patent No. 6160945, is disclosed. Japanese Patent No. 6160945 discloses a method of acquiring data of an outside temperature and a room temperature inside the building, generating a regression formula that obtains the room temperature from the outside temperature as a prediction formula, and predicting a transition of the room temperature change from a predicted transition of the outside temperature using the prediction formula.

However, the method of Japanese Patent No. 6160945 is regarded as a technique of estimating the room temperature without room cooling or heating of a room. In practice, in many cases, an air conditioner is used inside a plant, and not only a change in the outside temperature, but also influences of the air conditioner should be considered. Further, a plant environment is considered to vary according to an operation method of the air conditioner and heat insulating performance of the building, such as when the air conditioner is always used and when the air conditioner is only used during working hours in the daytime, and when heat insulating properties against the outside temperature is high and when the heat insulating properties is low. For predicting the room temperature change inside the plant, it is effective to predict after considering what kind of property the plant environment has.

On the other hand, it is considered possible with known techniques to predict the room temperature change inside the plant with a computer simulation by inputting information, such as the heat insulating performance of the building of the plant, setting of the air conditioning used in the plant, and heat generation by the operation of equipment other than a target machine tool. However, it is difficult to accurately input all the information required for the calculation in an actual production site.

Therefore, it is an object of the disclosure to provide an environmental temperature change prediction device and a prediction method for a machine tool that ensure appropriately predicting an environmental temperature in accordance with a plant environment in which the machine tool is placed from data of a machine body and/or peripheral temperature of the machine tool, from which data can be easily acquired, and a plant outside temperature.

SUMMARY

In order to achieve the above-described object, there is provided an environmental temperature change prediction device for a machine tool. The environmental temperature change prediction device predicts an environmental temperature change in a plant in which the machine tool is installed. The environmental temperature change prediction device includes an environmental temperature acquisition unit, an outside temperature acquisition unit, a plant environment pattern setting unit, a prediction model generating unit, and an environmental temperature change prediction unit. The environmental temperature acquisition unit measures at least of one of a machine body temperature at a part insusceptible to heat generation of a heat generator of the machine tool and a peripheral temperature with a temperature sensor and acquires the measured temperature as an environmental temperature. The outside temperature acquisition unit acquires a temperature outside the plant as a plant outside temperature by at least of one of measurement with a temperature sensor and weather data. The plant environment pattern setting unit defines in advance a classification rule for classifying change trends of the environmental temperature into a plurality of patterns based on data of the environmental temperature and the plant outside temperature. The plant environment pattern setting unit also defines environmental temperature prediction models that differ for the respective patterns as plant environment patterns. The prediction model generating unit selects the applicable plant environment pattern from the classification rule based on the data of at least of one of the environmental temperature and the plant outside temperature in a past and determines a parameter of the environmental temperature prediction model corresponding to the selected plant environment pattern. The environmental temperature change prediction unit predicts a change in the environmental temperature in a future by the environmental temperature prediction model generated in the prediction model generating unit.

According to another aspect of the disclosure, in the above-described configuration, the environmental temperature change prediction device further includes an outside temperature prediction data acquisition unit that acquires future prediction data of the plant outside temperature as outside temperature prediction data. The environmental temperature change prediction unit predicts the change in the environmental temperature in the future with the outside temperature prediction data and the environmental temperature prediction model.

According to another aspect of the disclosure, in the above-described configuration, the classification rule in the plant environment pattern setting unit is a rule for classifying based on a change width of the environmental temperature change in a past, a magnitude of a correlation between the plant outside temperature in a past on which a time lag process has been performed and the environmental temperature change, and a periodicity of the environmental temperature change in a past.

According to another aspect of the disclosure, in the above-described configuration, the environmental temperature prediction model defined in the plant environment pattern setting unit is any of a constant temperature, a function of a time or a day of week, or a transfer function in which the plant outside temperature is an input.

According to another aspect of the disclosure, in the above-described configuration, the plant environment pattern setting unit sets the environmental temperature prediction model as the constant temperature when a change width of the environmental temperature change falls below a predetermined change width threshold. On the other hand, the plant environment pattern setting unit sets the environmental temperature prediction model as the transfer function in which the plant outside temperature is an input when the change width is equal to or more than the change width threshold and the magnitude of the correlation is higher than a predetermined coefficient threshold. The plant environment pattern setting unit also sets the environmental temperature prediction model as the function of a time or a day of week when the change width is equal to or more than the change width threshold, the magnitude of the correlation is equal to or less than the coefficient threshold. The plant environment pattern setting unit further sets daily or weekly periodicity is present in the environmental temperature change in the past, and sets the environmental temperature prediction model as indeterminable when the change width is equal to or more than the change width threshold, the magnitude of the correlation is equal to or less than the coefficient threshold, and daily or weekly periodicity is absent in the environmental temperature change in the past.

According to another aspect of the disclosure, in the above-described configuration, the environmental temperature change prediction device further includes a prediction result notification unit that notifies the change in the environmental temperature in the future predicted in the environmental temperature change prediction unit.

In order to achieve the above-described object, there is provided an environmental temperature change prediction method for a machine tool. The environmental temperature change prediction method predicts an environmental temperature change in a plant in which the machine tool is installed. The environmental temperature change prediction method includes an environmental temperature acquisition step of measuring at least of one of a machine body temperature at a part insusceptible to heat generation of a heat generator of the machine tool and a peripheral temperature with a temperature sensor and acquiring the measured temperature as an environmental temperature. The environmental temperature change prediction method also includes an outside temperature acquisition step of acquiring a temperature outside the plant as a plant outside temperature by at least of one of measurement with a temperature sensor and weather data. The environmental temperature change prediction method further includes a plant environment pattern setting step of defining in advance a classification rule for classifying change trends of the environmental temperature into a plurality of patterns based on data of the environmental temperature and the plant outside temperature and environmental temperature prediction models that differ for the respective patterns as plant environment patterns. Moreover, the environmental temperature change prediction method includes a prediction model generating step of selecting the applicable plant environment pattern from the classification rule based on at least of one of the data of the environmental temperature and the plant outside temperature in a past and determining a parameter of the environmental temperature prediction model corresponding to the selected plant environment pattern. In addition, the environmental temperature change prediction method also includes an environmental temperature change prediction step of predicting a change in the environmental temperature in a future by the environmental temperature prediction model generated in the prediction model generating step.

According to another aspect of the disclosure, in the above-described configuration, further includes an outside temperature prediction data acquisition step of acquiring future prediction data of the plant outside temperature as outside temperature prediction data before the environmental temperature change prediction step. Then, the environmental temperature change prediction step includes predicting the change in the environmental temperature in the future with the outside temperature prediction data and the environmental temperature prediction model.

According to another aspect of the disclosure, in the above-described configuration, the classification rule in the plant environment pattern setting step is a rule for classifying based on a change width of the environmental temperature change in a past, a magnitude of a correlation between the plant outside temperature in a past on which a time lag process has been performed and the environmental temperature change, and periodicity of the environmental temperature change in the past.

According to another aspect of the disclosure, in the above-described configuration, the environmental temperature prediction model defined in the plant environment pattern setting step is any of a constant temperature, a function of a time or a day of week, or a transfer function in which the plant outside temperature is an input.

According to another aspect of the disclosure, in the above-described configuration, the plant environment pattern setting step includes setting of the environmental temperature prediction model as the constant temperature when a change width of the environmental temperature change falls below a predetermined change width threshold. The plant environment pattern setting step also includes setting the environmental temperature prediction model as the transfer function in which the plant outside temperature is an input when the change width is equal to or more than the change width threshold and the magnitude of the correlation is higher than a predetermined coefficient threshold. The plant environment pattern setting step further includes setting the environmental temperature prediction model as the function of a time or a day of week when the change width is equal to or more than the change width threshold, the magnitude of the correlation is equal to or less than the coefficient threshold. Moreover, the plant environment pattern setting step includes daily or weekly periodicity is present in the environmental temperature change in the past, and setting the environmental temperature prediction model as indeterminable when the change width is equal to or more than the change width threshold, the magnitude of the correlation is equal to or less than the coefficient threshold, and daily or weekly periodicity is absent in the environmental temperature change in the past.

According to another aspect of the disclosure, in the above-described configuration, the environmental temperature change prediction method further includes a prediction result notification step of notifying the change in the environmental temperature in the future predicted in the environmental temperature change prediction unit.

With the disclosure, the environmental temperature around the machine tool and the plant outside temperature are acquired, and based on the data, the change trend of the environmental temperature is classified into some patterns. The patterns are linked to some assumed plant environment patterns, such as the plant environment similar to a constant temperature chamber, the plant environment having low heat insulating properties and greatly influenced by the outside temperature, and the plant environment greatly influenced by the air conditioner or surrounding heat source. Furthermore, since the different environmental temperature prediction models are prepared for the respective plant environment patterns, the environmental temperature can be appropriately predicted in accordance with the plant environment where the machine tool is placed. The prediction is performed by first diagnosing what kind of pattern the plant environment where the machine tool is placed applies to and next determining the parameter of the environmental temperature prediction model in accordance with the acquired data. That is, from the data of at least of one of the machine body and peripheral temperature of the machine tool, from which data can be easily acquired, and the plant outside temperature, the environmental temperature can be appropriately predicted in accordance with the plant environment where the machine tool is placed.

With another aspect of the disclosure, in addition to the above-described effects, since the change in the environmental temperature in the future is predicted by the outside temperature prediction data and the environmental temperature prediction model, the parameter of the prediction model can be determined in accordance with the future prediction data of the plant outside temperature. Furthermore, the environmental temperature can be appropriately predicted in accordance with the plant environment having low heat insulating properties and greatly influenced by the outside temperature.

With another aspect of the disclosure, in addition to the above-described effects, the plant environment patterns can be appropriately classified from the acquired data of the environmental temperature around the machine tool and the plant outside temperature. The classification is made by setting the classification rule as being a rule for classifying based on the change width of the environmental temperature change in the past of the plant, the magnitude of the correlation between the temperature change outside the plant in the past on which the time lag process has been performed and the environmental temperature change of the plant, and the periodicity of the environmental temperature change of the plant in the past.

With another aspect of the disclosure, in addition to the above-described effects, in accordance with the classified plant environment pattern, by setting the environmental temperature prediction model as any of the constant temperature, the function of the time or day of week, or the transfer function in which the temperature outside the plant is the input, the appropriate environmental temperature prediction model in accordance with the plant environment can be generated.

With another aspect of the disclosure, in addition to the above-described effects, by setting the algorithm that determines the environmental temperature prediction model using the classification rule, based on the acquired data of the environmental temperature around the machine tool and the plant outside temperature, the environmental temperature prediction model in accordance with the plant environment can be automatically determined, and the environmental temperature change can be easily predicted.

With another aspect of the disclosure, in addition to the above-described effects, by notifying the predicted environmental temperature change, the problem of generating a failure in the machining accuracy caused by the thermal displacement due to the environmental temperature change can be avoided.

DETAILED DESCRIPTION

The following describes an embodiment of the disclosure based on the drawings.

Figure 1:
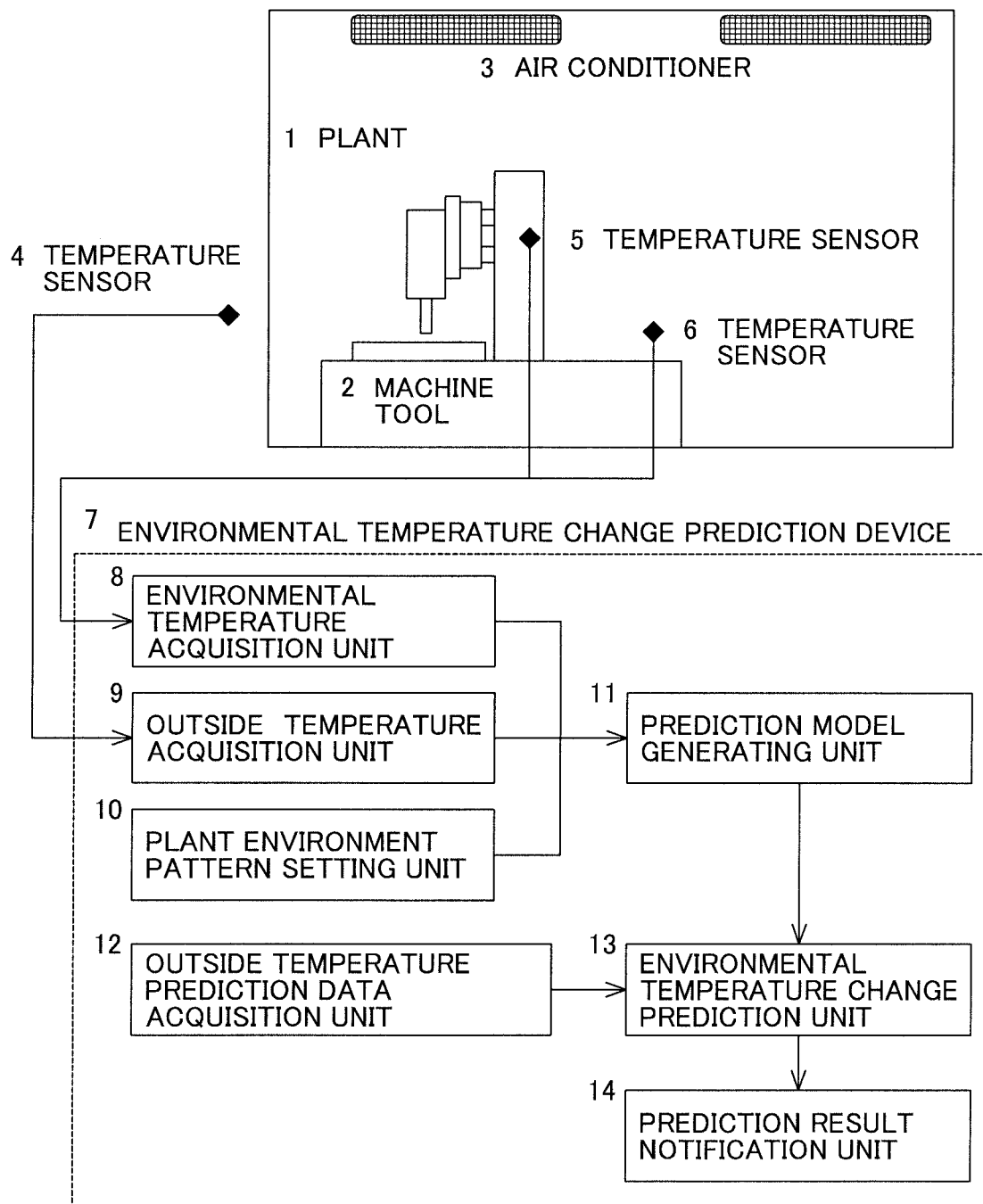
FIG. 1 is a block diagram of an environmental temperature change prediction device for a machine tool.

FIG. 1 is a block diagram of an environmental temperature change prediction device for a machine tool to which the disclosure is applied.

Inside a building of a plant 1, a machine tool 2 and an air conditioner 3 that controls a room temperature of the plant 1 are installed. Outside the plant 1, a temperature sensor 4 that measures a plant outside temperature is installed. In the machine tool 2 inside the plant 1, a temperature sensor 5 that measures a temperature of a part (column in the example) insusceptible to a heat generator, such as a spindle, and a temperature sensor 6 that measures a peripheral temperature are installed.

The plant outside temperature may be acquired by installing the temperature sensor 4 at a part that is regarded as having a temperature similar to the plant outside temperature, such as an outer wall of the plant 1. The plant outside temperature may be acquired as weather data in a region where the plant 1 is located through the Internet and the like, and in that case, the temperature sensor 4 can be omitted. Using both data of the weather data and the temperature sensor 4, the plant outside temperature may be acquired by, for example, taking an average, and the like. Only any one of the temperature sensor 5 or the temperature sensor 6 may be installed.

When the room temperature inside the plant 1 changes, thermal displacement occurs on the machine tool 2, and machining accuracy deteriorates in some cases. In order to predict it in advance, an environmental temperature change prediction device 7 is installed. The environmental temperature change prediction device 7 may be built in an NC device of the machine tool 2 or may be incorporated in an electronic device different from the machine tool 2.

In the environmental temperature change prediction device 7, an environmental temperature acquisition unit 8 that acquires data of an environmental temperature change of the machine tool 2 using the temperature sensors 5 and 6, an outside temperature acquisition unit 9 that acquires plant outside temperature data using the temperature sensor 4 or the like, and a plant environment pattern setting unit 10 are disposed.

In the plant environment pattern setting unit 10, a plurality of patterns that are classified based on change trends of an environmental temperature and environmental temperature prediction models (hereinafter referred to as "prediction models") that predict the environmental temperature changes for the respective patterns are defined in advance as plant environment patterns (plant environment pattern setting step). In the plant environment pattern setting unit 10, an algorithm for diagnosing and classifying the plant environment pattern based on the data of the environmental temperature acquired in the environmental temperature acquisition unit 8 and the plant outside temperature acquired in the outside temperature acquisition unit 9 has been input.

In the environmental temperature change prediction device 7, a prediction model generating unit 11, an outside temperature prediction data acquisition unit 12, an environmental temperature change prediction unit 13, and a prediction result notification unit 14 are disposed.

The prediction model generating unit 11 selects the plant environment pattern set in the plant environment pattern setting unit 10, and determines a parameter of the prediction model corresponding to the selected plant environment pattern. The selection of the plant environment pattern is performed based on temperature data in a past accumulated by the environmental temperature acquisition unit 8, the outside temperature acquisition unit 9 and the algorithm input in the plant environment pattern setting unit 10.

The outside temperature prediction data acquisition unit 12 acquires outside temperature prediction data in a future by acquiring weather forecast data through the Internet and the like or using another prediction means.

The environmental temperature change prediction unit 13 predicts the environmental temperature change of the machine tool 2 in a future using the prediction model generated in the prediction model generating unit 11 and the outside temperature prediction data acquired in the outside temperature prediction data acquisition unit 12. Alternatively, to predict the environmental temperature change of the machine tool 2 in a future, the environmental temperature change prediction unit 13 use the prediction model and the temperature data in a past accumulated by the environmental temperature acquisition unit 8 and the outside temperature acquisition unit 9, instead of the outside temperature prediction data.

The prediction result notification unit 14 notifies an operator who uses the machine tool 2 of the environmental temperature change predicted in the environmental temperature change prediction unit 13. In a case where the predicted environmental temperature change is larger than a predetermined change width and deterioration in the machining accuracy of the machine tool 2 is predicted, the prediction result notification unit 14 notifies an alarm. The prediction result notification unit 14 may display the result on a screen or may have a function that gives an email notification of the result to another terminal.

Figure 2A:
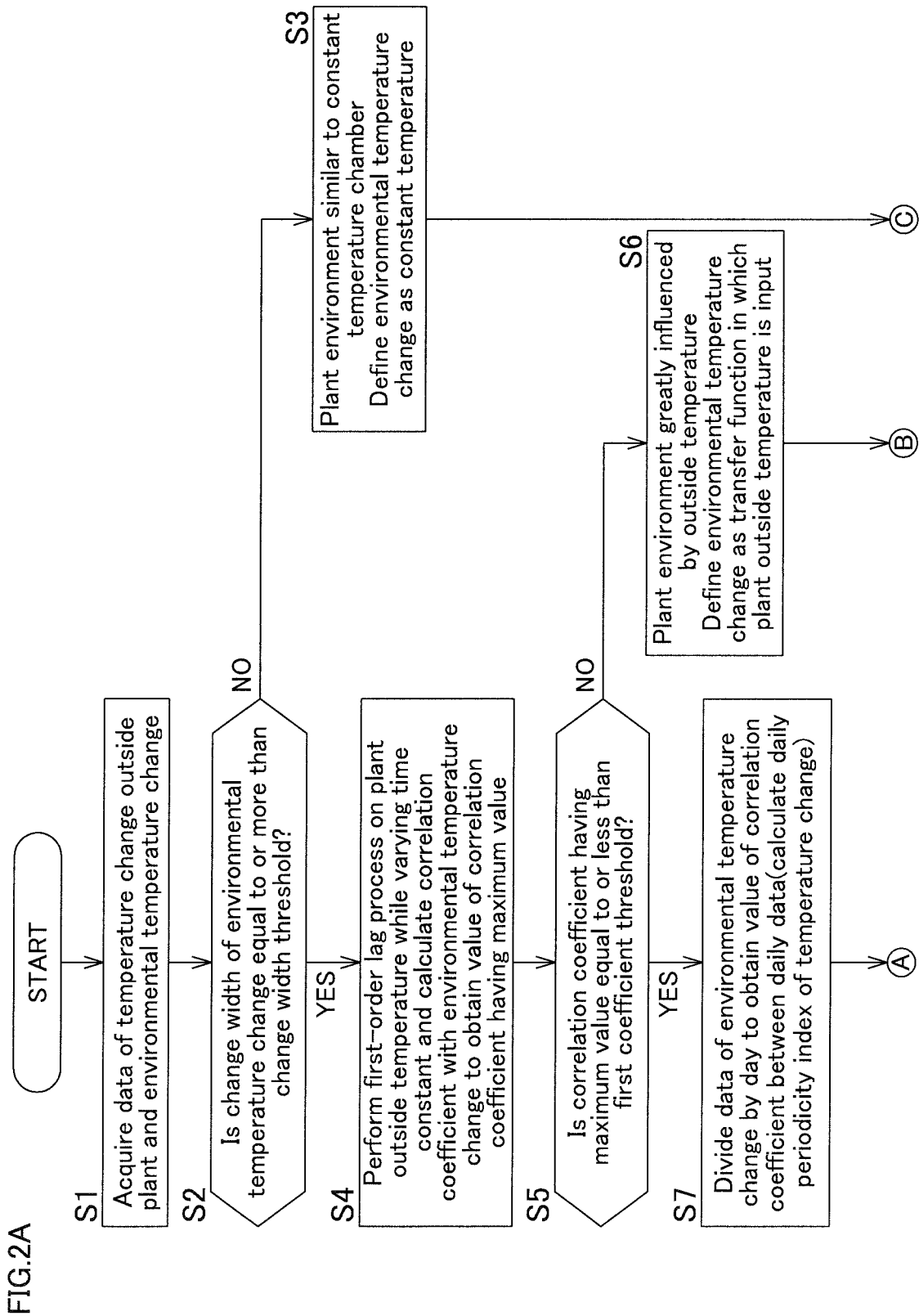
FIG. 2A is a flowchart illustrating an algorithm of an environmental temperature change prediction method.
Figure 2B:
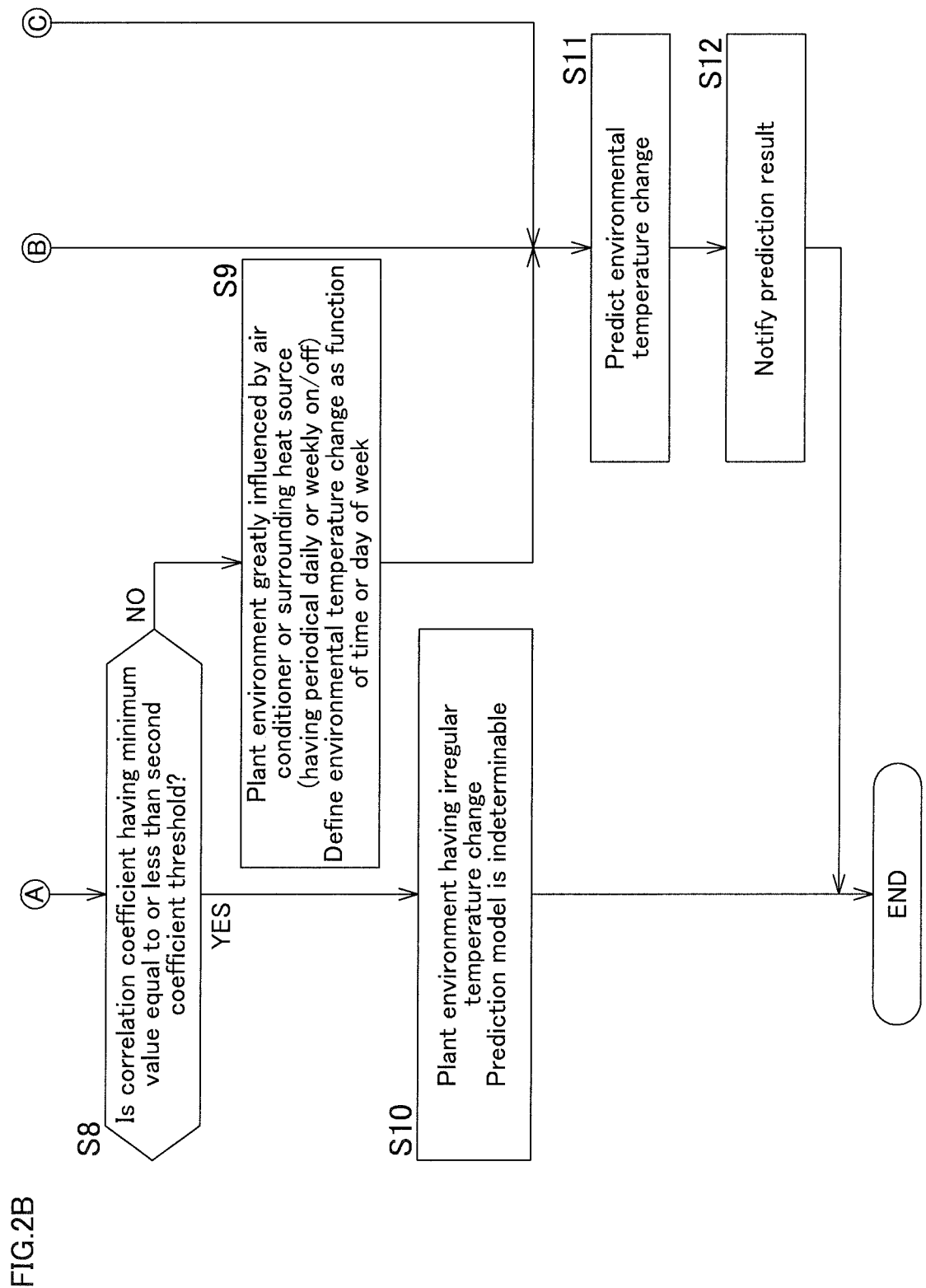
FIG. 2B is a flowchart illustrating an algorithm of an environmental temperature change prediction method.

Next, an environmental temperature change prediction method performed by the environmental temperature change prediction device 7 will be described using a flowchart in FIGS. 2A and 2B. The circled A, B and C designators in FIGS. 2A and 2B show how the flow diagram in FIG. 2A continues to the flow diagram in FIG. 2B.

First, in S1, the environmental temperature acquisition unit 8 and the outside temperature acquisition unit 9 acquire the data of a temperature change outside the plant and an environmental temperature change of the machine tool 2 (environmental temperature acquisition step and outside temperature acquisition step). An acquisition period is about one week to one month as a typical example.

Next, in S2, the plant environment pattern setting unit 10 calculates a change width of the environmental temperature change within the period to determine whether the change width is equal to or more than a predetermined change width threshold. The change width threshold has been determined considering required accuracy in machining of the machine tool 2 and the like. The change width threshold is about 1° C. to 3° C. as a typical example. In a case where the change width is smaller than the change width threshold, in S3, the plant environment is determined to be similar to a constant temperature chamber. In this case, in the prediction model generating unit 11, the prediction model of the environmental temperature change is defined as an average temperature (constant temperature) within a measurement period in a past as indicated by the following Formula (1) (prediction model generating step).

[Math. 1]

$$\hat{\theta}_m = E(\theta_{m,i}) \qquad (1)$$

$\theta_{m,i}$: Measured value of environmental temperature change $E(\theta_{m,i})$: Average value of measured values of environmental temperature change $\hat{\theta}_m$: Predicted value of environmental temperature change In the determination of S2, in a case where the change width of the environmental temperature change within the period is equal to or more than the change width threshold, in S4, the plant environment pattern setting unit 10 performs a process of performing a first-order lag process on the plant outside temperature while varying a time constant. Then, the plant environment pattern setting unit 10 performs a process of calculating a correlation coefficient with the environmental temperature change to obtain a value of the correlation coefficient having the maximum value. First, the first-order lag process is performed on an actually measured plant outside temperature $\theta_{a,i}$ by the following Formula (2) to obtain a plant outside temperature $\theta_{aT,i}$.

[Math. 2]

$$\theta_{aT,i} = \theta_{aT,i-1} + \frac{\Delta t}{\Delta t + T}(\theta_{a,i} - \theta_{aT,i-1}) \qquad (2)$$

$\Delta t$: Cycle of temperature measurement
$T$: First-order lag time constant (assumed value)

$\theta_{a,i}$: Measured value of plant outside temperature $\theta_{aT,i}$: Plant outside temperature on which first-order lag process has been performed with time constant T Next, a correlation coefficient between the plant outside temperature $\theta_{aT,i}$ on which the first-order lag process has been performed with the time constant T obtained by Formula (2) and an actually measured value $\theta_{m,i}$ of the environmental temperature change is obtained. While the first-order lag time constant T in Formula (2) is varied, a correlation coefficient $r_{max}$ having the maximum value is obtained by the following Formula (3).

[Math. 3]

$$r_{max} = \max\{r(T)\} = \max\left\{\frac{s_{\theta_{aT,i}\theta_{m,i}}}{s_{\theta_{aT,i}} s_{\theta_{m,i}}}\right\} \quad (3)$$

$s_{\theta_{m,i}}$: Standard deviation of measured values of environmental temperature change $s_{\theta_{aT,i}}$: Standard deviation of plant outside temperatures on which first-order lag process has been performed $s_{\theta_{aT,i}\theta_{m,i}}$: Covariance between measured values of environmental temperature change and plant outside temperatures on which first-order lag process has been performed Next, in S5, the plant environment pattern setting unit 10 determines whether the correlation coefficient $r_{max}$ having the maximum value obtained by Formula (3) is equal to or less than a predetermined first coefficient threshold. The first coefficient threshold is preset and about 0.8 as a typical example.

When the correlation coefficient $r_{max}$ exceeds the first coefficient threshold, in S6, the plant environment is determined to be greatly influenced by outside temperature. At this time, in the prediction model generating unit 11, the prediction model of the environmental temperature change is defined as a transfer function in which the plant outside temperature is an input. Specifically, the prediction model can be defined by using a first-order lag time constant $T_m$ with which the correlation coefficient obtained by Formula (2) and Formula (3) becomes the maximum to calculate a first-order lag of a predicted value of the plant outside temperature by the following Formula (4) of a first-order lag similar to Formula (2) and conducting a linear conversion by the following Formula (5) (prediction model generating step).

[Math. 4]

$$\hat{\theta}_{aTm,i} = \hat{\theta}_{aTm,i-1} + \frac{\Delta t}{\Delta t + T_m}(\hat{\theta}_{a,i} - \hat{\theta}_{aTm,i-1}) \quad (4)$$

$$\hat{\theta}_{m,i} = a\hat{\theta}_{aTm,i} + b \quad (5)$$

$\Delta t$: Cycle of temperature measurement $T_m$: First-order lag time constant (time constant when correlation coefficient $r_{max}$ becomes maximum)

$\hat{\theta}_{a,i}$: Predicted value of plant outside temperature $\hat{\theta}_{aTm,i}$: Predicted value of plant outside temperature on which first-order lag process has been performed with time constant $T_m$ $\hat{\theta}_{m,i}$: Predicted value of environmental temperature change a, b: Constant In the determination of S5, in a case where the correlation coefficient $r_{max}$ having the maximum value is equal to or less than the first coefficient threshold, in S7, the plant environment pattern setting unit 10 calculates a daily periodicity index of the temperature change. For a calculation method, for example, a method of dividing the data of the environmental temperature change by day to obtain the correlation coefficient between daily data is used. At this time, the correlation coefficient between the data is calculated in ½×(the number of days)×(the number of days−1) patterns.

In S8, the plant environment pattern setting unit 10 determines by comparing the correlation coefficient having the minimum value among the patterns with a preset second coefficient threshold. For the determination, instead of the correlation coefficient having the minimum value, the comparison may be performed by taking an average value of the obtained correlation coefficients. Since the scale of the temperature change is ignored in a method in which the correlation coefficient is used for the determination, the determination may be performed considering the scale of the temperature change by calculating an index equivalent to a distance between the data, such as a root mean square of a difference. The periodicity may be determined by dividing the data not by day, but by week, and obtaining the correlation coefficient and the distance between the data. The method is effective to determine a case where the air conditioner is used on weekdays with nighttime included but is powered down on weekends.

In the determination of S8, in a case where the correlation coefficient between the data is larger than the second coefficient threshold, it means that the periodicity is present, and therefore, in S9, the plant environment is determined to be greatly influenced by the air conditioner or the surrounding heat source having a periodical daily or weekly ON/OFF. In this case, in the prediction model generating unit 11, the prediction model of the environmental temperature change is defined as a function of a time or day of week (prediction model generating step). Specifically, as indicated by the following Formula (6), a linear function of the average value taken from the measured values corresponding to each time and day of week is set as a predicted value, point cloud data between the time and the predicted value is created, and interpolated values between respective points make a function that expresses the environmental temperature change.

[Math. 5]

$$\hat{\theta}_{m,t} = a\overline{\theta}_{m,t} + b \quad (6)$$

$\hat{\theta}_{m,t}$: Predicted value of environmental temperature change at certain time on certain day of week $\overline{\theta}_{a,t}$: Average value of measurement result of environmental temperature change at certain time on certain day of week a, b: Constant On the other hand, in the determination of S8, in a case where the correlation coefficient between the data is equal to or less than the second coefficient threshold, it means that the correlation between the temperature change outside the plant on which the time lag process has been performed and the environmental temperature change is low, and the periodicity is absent in the environmental temperature change. At this time, in S10, the plant environment is determined to have an irregular temperature change and the prediction model is indeterminable in the prediction model generating unit 11. In this case, the prediction result notification unit 14 can present to the operator of the machine tool 2 that a cause of the irregular temperature change should be identified to improve the plant environment.

By the above-mentioned method, the plant environment pattern setting unit 10 classifies the plant environment patterns into (S3) plant environment similar to a constant temperature chamber, (S6) plant environment greatly influenced by an outside temperature, (S9) plant environment greatly influenced by an air conditioner or surrounding heat source, and (S10) plant environment having an irregular temperature change, and determines the prediction model corresponding to each classification.

Accordingly, the prediction model generating unit 11 selects the applicable plant environment pattern based on the data of the environmental temperature and/or the plant outside temperature in the past and determines the parameter of the prediction model in the selected plant environment pattern.

Referring to the prediction model in which the parameter is thus determined, in S11, the environmental temperature change prediction unit 13 predicts the environmental temperature change, from the environmental temperature data in the past accumulated by the environmental temperature acquisition unit 8 and the outside temperature acquisition unit 9 in the cases of S3 and S9. The environmental temperature change prediction unit 13 predicts the environmental temperature change from the prediction data of the plant outside temperature in the future acquired from the outside temperature prediction data acquisition unit 12 in the case of S6 (environmental temperature change prediction step).

In S12, the prediction result in the environmental temperature change prediction unit 13 is notified by the prediction result notification unit 14 (prediction result notification step).

Finally, a specific example of diagnosing a plant environment from measured data to predict an environmental temperature using the disclosure is described.

Figure 3:
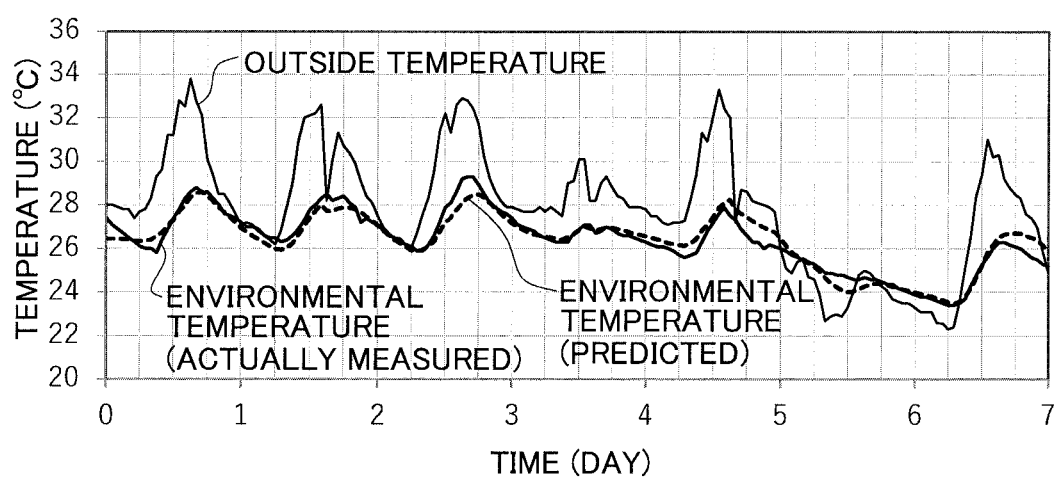
FIG. 3 is a graph illustrating an example of a temperature change of a plant environment greatly influenced by an outside temperature.
Figure 4:
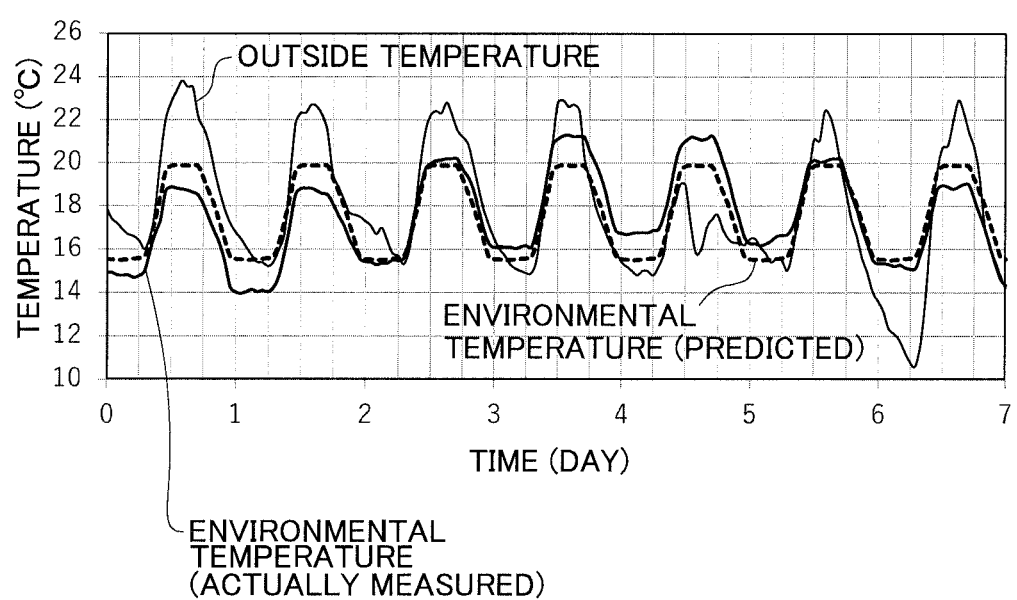
FIG. 4 is a graph illustrating an example of a temperature change of a plant environment greatly influenced by an air conditioner or surrounding heat source.

FIG. 3 and FIG. 4 are each a graph of an actually measured value and a predicted value of an outside temperature change and an environmental temperature change (room temperature change inside a plant) for one week in a different plant in a different season. Referring to the graphs, it can be seen that the outside temperature changes in a manner of becoming high in the daytime and becoming low at night in one day cycle. However, the outside temperature is influenced also by the weather and a way that the temperature rises varies from day to day. For example, since it rained on the sixth day in FIG. 3 and the fifth day in FIG. 4, the way that the temperature rises is small compared with other days.

On the other hand, looking at the environmental temperature changes, it can be seen that, while in FIG. 3, the environmental temperature change is also small on the day when the outside temperature change is small, in FIG. 4, the temperature rises to near 20° C. in the daytime irrespective of the outside temperature change. The environmental temperature changes of the plants of FIG. 3 and the FIG. 4 are considered to have different properties.

From the changes of FIG. 3 and FIG. 4, prediction models are obtained based on the flowchart in FIGS. 2A and 2B. In the example, the change width threshold of the environmental temperature change in S2 is set to 3° C., the first coefficient threshold of the correlation coefficient between the outside temperature and the environmental temperature in S5 is set to 0.8, and the second coefficient threshold of the minimum value of the correlation coefficient between the daily data in S8 is set to 0.7.

At this time, in the plant of FIG. 3, in S2, the change width of the environmental temperature change for one week is 5.9° C., which is determined to be larger than the change width threshold 3° C. Next, in S4, when the first-order lag process is performed on the plant outside temperature while the time constant is varied and the correlation coefficient with the environmental temperature change is calculated to obtain a value of the correlation coefficient having the maximum value, $r_{max}=0.95$ is obtained, which is determined to be larger than the first coefficient threshold 0.8 in S5. As a result, in S6, the plant environment is diagnosed to be greatly influenced by the outside temperature, and the environmental temperature change is defined as the transfer function in which the plant outside temperature is the input. When the transfer function is actually calculated, the prediction result as indicated by the dashed line in FIG. 3 is obtained and turned out to well represent the actually measured environmental temperature change.

On the other hand, in the plant of FIG. 4, in S2, the change width of the environmental temperature change for one week is 7.3° C., which is determined to be larger than the change width threshold 3° C. Next, in S4, when the first-order lag process is performed on the plant outside temperature while the time constant is varied and the correlation coefficient with the environmental temperature change is calculated to obtain a value of the correlation coefficient having the maximum value, $r_{max}=0.68$ is obtained, which is determined to be smaller than the first coefficient threshold 0.8 in S5. Next, in S7, when the data of the environmental temperature change is divided by day to obtain the correlation coefficient between the data, 21 patterns of the correlation coefficients can be obtained for seven days and range from 0.94 to 0.99 with the data. In S8, the correlation coefficient 0.94 having the minimum value is determined to be larger than the second coefficient threshold 0.7. As a result, in S9, the plant environment is diagnosed to be greatly influenced by an air conditioner or surrounding heat source, and the environmental temperature change is defined as the function of the time. When average values of the temperatures in respective time slots for seven days are taken and calculated as the function of the time, the prediction result as indicated by the dashed line in FIG. 4 is obtained and turned out to represent the trend of the environmental temperature change for one day of the actual measurement.

As described above, the environmental temperature change prediction device 7 of the machine tool 2 with the above-described configuration includes the environmental temperature acquisition unit 8, the outside temperature acquisition unit 9, the plant environment pattern setting unit 10, the prediction model generating unit 11, and the environmental temperature change prediction unit 13, and performs the environmental temperature change prediction method in FIGS. 2A and 2B. The environmental temperature acquisition unit 8 measures the machine body temperature at a part insusceptible to the heat generation of the heat generator of the machine tool 2 and the peripheral temperature by the temperature sensors 5 and 6 and acquires it as the environmental temperature. The outside temperature acquisition unit 9 acquires the temperature outside the plant by measurement with the temperature sensor 4 and/or the weather data as the plant outside temperature. The plant environment pattern setting unit 10 defines in advance the classification rule for classifying the change trend of the environmental temperature into a plurality of patterns based on the data of the environmental temperature and the plant outside temperature, and the prediction models that differ for the respective patterns, as the plant environment patterns. The prediction model generating unit 11 selects the applicable plant environment pattern from the classification rule based on the data of the environmental temperature and/or the plant outside temperature in the past and determines the parameter of the corresponding prediction model. The environmental temperature change prediction unit 13 predicts a change in the environmental temperature in the future by the prediction model generated in the prediction model generating unit 11.

With the configuration, the environmental temperature around the machine tool 2 and the plant outside temperature are acquired, and based on the data, the change trend of the environmental temperature is classified into some patterns. The patterns are linked to some assumed plant environment patterns, such as the plant environment similar to a constant temperature chamber, the plant environment having low heat insulating properties and greatly influenced by the outside temperature, and the plant environment greatly influenced by the air conditioner or surrounding heat source. Furthermore, since the different prediction models are prepared for the respective plant environment patterns, the environmental temperature can be appropriately predicted in accordance with the plant environment where the machine tool 2 is placed by first diagnosing what kind of pattern the plant environment where the machine tool 2 is placed applies to and next determining the parameter of the prediction model in accordance with the acquired data. That is, from the data of the machine body and peripheral temperatures of the machine tool 2, from which data can be easily acquired, and the plant outside temperature, the environmental temperature can be appropriately predicted in accordance with the plant environment where the machine tool 2 is placed.

In particular, since the outside temperature prediction data acquisition unit 12 that acquires the future prediction data of the plant outside temperature as the outside temperature prediction data is further provided, the environmental temperature change prediction unit 13 predicts the change in the environmental temperature in the future with the outside temperature prediction data and the prediction model. Therefore, the parameter of the prediction model can be determined in accordance with the future prediction data of the plant outside temperature, and the environmental temperature can be appropriately predicted in accordance with the plant environment having low heat insulating properties and greatly influenced by the outside temperature.

The classification rule in the plant environment pattern setting unit 10 is a rule for classifying based on the change width of the environmental temperature change in the past, the magnitude of the correlation between the plant outside temperature in the past on which the time lag process has been performed and the environmental temperature change, and the periodicity of the environmental temperature change in the past. Therefore, the plant environment patterns can be appropriately classified from the acquired data of the environmental temperature around the machine tool 2 and the plant outside temperature.

Since, in accordance with the classified plant environment pattern, the prediction model is set as any of the constant temperature, the function of the time or day of week, or the transfer function in which the temperature outside the plant is the input, the appropriate prediction model in accordance with the plant environment can be generated.

In addition, the plant environment pattern setting unit 10 sets the prediction model as the constant temperature in the case where the change width of the environmental temperature change falls below a predetermined change width threshold. The plant environment pattern setting unit 10 sets the prediction model as the transfer function in which the plant outside temperature is the input in the case where the change width is equal to or more than the change width threshold and the magnitude of the correlation is higher than a predetermined first coefficient threshold. The plant environment pattern setting unit 10 sets the prediction model as the function of the time or day of week in the case where the change width is equal to or more than the change width threshold, the magnitude of the correlation is equal to or less than the first coefficient threshold, and the daily or weekly periodicity is present in the environmental temperature change in the past. The plant environment pattern setting unit 10 sets the prediction model as indeterminable in the case where the change width is equal to or more than the change width threshold, the magnitude of the correlation is equal to or less than the first coefficient threshold, and the daily or weekly periodicity is absent in the environmental temperature change in the past. Accordingly, based on the acquired data of the environmental temperature around the machine tool 2 and the plant outside temperature, the prediction model in accordance with the plant environment can be automatically determined, and the environmental temperature change can be easily predicted.

Then, by further including the prediction result notification unit 14 that notifies the environmental temperature change in the future predicted by the environmental temperature change prediction unit 13, the problem of generating a failure in the machining accuracy caused by the thermal displacement due to the environmental temperature change can be avoided.

The temperature sensors that measure the machine body temperature of the machine tool, the peripheral temperature, and the plant outside temperature are not limited to one each, and a plurality of temperature sensors may be disposed to take an average of a plurality of measured values.

The plant environment patterns defined in the plant environment pattern setting unit are not limited to the three patterns with the above-described configuration and may be further subdivided and increased.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An environmental temperature change prediction device for a machine tool that predicts an environmental temperature change in a plant in which the machine tool is installed, the environmental temperature change prediction device comprising:
   an environmental temperature acquisition unit that measures at least of one of a machine body temperature at a part insusceptible to heat generation of a heat generator of the machine tool and a peripheral temperature with a temperature sensor and acquires the measured temperature as an environmental temperature;
   an outside temperature acquisition unit that acquires a temperature outside the plant as a plant outside temperature by at least of one of measurement with a temperature sensor and weather data;

a plant environment pattern setting unit that defines in advance a classification rule for classifying change trends of the environmental temperature into a plurality of patterns based on data of the environmental temperature and the plant outside temperature and environmental temperature prediction models that differ for the respective patterns as plant environment patterns;

a prediction model generating unit that selects the applicable plant environment pattern from the classification rule based on at least of one of the data of the environmental temperature and the plant outside temperature in a past and determines a parameter of the environmental temperature prediction model corresponding to the selected plant environment pattern; and an environmental temperature change prediction unit that predicts a change in the environmental temperature in a future by the environmental temperature prediction model generated in the prediction model generating unit.

2. The environmental temperature change prediction device for a machine tool according to claim 1, further comprising an outside temperature prediction data acquisition unit that acquires future prediction data of the plant outside temperature as outside temperature prediction data, wherein the environmental temperature change prediction unit predicts the change in the environmental temperature in the future with the outside temperature prediction data and the environmental temperature prediction model.

3. The environmental temperature change prediction device for a machine tool according to claim 1, wherein the classification rule in the plant environment pattern setting unit is a rule for classifying based on a change width of the environmental temperature change in a past, a magnitude of a correlation between the plant outside temperature in a past on which a time lag process has been performed and the environmental temperature change, and a periodicity of the environmental temperature change in a past.

4. The environmental temperature change prediction device for a machine tool according to claim 3, wherein the environmental temperature prediction model defined in the plant environment pattern setting unit is any of a constant temperature, a function of a time or a day of week, or a transfer function in which the plant outside temperature is an input.

5. The environmental temperature change prediction device for a machine tool according to claim 4, wherein the plant environment pattern setting unit:

sets the environmental temperature prediction model as the constant temperature when a change width of the environmental temperature change falls below a predetermined change width threshold;

sets the environmental temperature prediction model as the transfer function in which the plant outside temperature is an input when the change width is equal to or more than the change width threshold and the magnitude of the correlation is higher than a predetermined coefficient threshold;

sets the environmental temperature prediction model as the function of a time or a day of week when the change width is equal to or more than the change width threshold, the magnitude of the correlation is equal to or less than the coefficient threshold, and daily or weekly periodicity is present in the environmental temperature change in the past; and sets the environmental temperature prediction model as indeterminable when the change width is equal to or more than the change width threshold, the magnitude of the correlation is equal to or less than the coefficient threshold, and daily or weekly periodicity is absent in the environmental temperature change in the past.

6. The environmental temperature change prediction device for a machine tool according to claim 1, further comprising a prediction result notification unit that notifies the change in the environmental temperature in the future predicted in the environmental temperature change prediction unit.

7. An environmental temperature change prediction method for a machine tool that predicts an environmental temperature change in a plant in which the machine tool is installed, the environmental temperature change prediction method comprising:

measuring at least of one of a machine body temperature at a part insusceptible to heat generation of a heat generator of the machine tool and a peripheral temperature with a temperature sensor and acquiring the measured temperature as an environmental temperature;

acquiring a temperature outside the plant as a plant outside temperature by at least of one of measurement with a temperature sensor and weather data;

defining in advance a classification rule for classifying change trends of the environmental temperature into a plurality of patterns based on data of the environmental temperature and the plant outside temperature and environmental temperature prediction models that differ for the respective patterns as plant environment patterns;

selecting the applicable plant environment pattern from the classification rule based on at least of one of the data of the environmental temperature and the plant outside temperature in a past and determining a parameter of the environmental temperature prediction model corresponding to the selected plant environment pattern; and predicting a change in the environmental temperature in a future by the environmental temperature prediction model generated in the selecting.

8. The environmental temperature change prediction method for a machine tool according to claim 7, wherein acquiring future prediction data of the plant outside temperature as outside temperature prediction data before the predicting, and the predicting includes predicting the change in the environmental temperature in the future with the outside temperature prediction data and the environmental temperature prediction model.

9. The environmental temperature change prediction method for a machine tool according to claim 7, wherein the classification rule in the defining is a rule for classifying based on a change width of the environmental temperature change in a past, a magnitude of a correlation between the plant outside temperature in a past on which a time lag process has been performed and the environmental temperature change, and periodicity of the environmental temperature change in the past.

10. The environmental temperature change prediction method for a machine tool according to claim 9, wherein the environmental temperature prediction model defined in the defining is any of a constant temperature, a function of a time or a day of week, or a transfer function in which the plant outside temperature is an input.

11. The environmental temperature change prediction method for a machine tool according to claim 10, wherein the defining includes:
setting the environmental temperature prediction model as the constant temperature when a change width of the environmental temperature change falls below a predetermined change width threshold;
setting the environmental temperature prediction model as the transfer function in which the plant outside temperature is an input when the change width is equal to or more than the change width threshold and the magnitude of the correlation is higher than a predetermined coefficient threshold;
setting the environmental temperature prediction model as the function of a time or a day of week when the change width is equal to or more than the change width threshold, the magnitude of the correlation is equal to or less than the coefficient threshold, and daily or weekly periodicity is present in the environmental temperature change in the past; and
setting the environmental temperature prediction model as indeterminable when the change width is equal to or more than the change width threshold, the magnitude of the correlation is equal to or less than the coefficient threshold, and daily or weekly periodicity is absent in the environmental temperature change in the past.

12. The environmental temperature change prediction method for a machine tool according to claim 7, further comprising
notifying the change in the environmental temperature in the future predicted in the environmental temperature change prediction unit.

\* \* \* \* \*